United States Patent
Drucktenhengst et al.

(10) Patent No.: US 9,719,597 B2
(45) Date of Patent: Aug. 1, 2017

(54) SEALING RING

(75) Inventors: Rolf Drucktenhengst, Lampertheim (DE); Udo Eping, Darmstadt (DE)

(73) Assignee: Carl Freudenberg KG, Weinheim (DE)

( * ) Notice: Subject to any disclaimer, the term of this patent is extended or adjusted under 35 U.S.C. 154(b) by 1396 days.

(21) Appl. No.: 13/307,618

(22) Filed: Nov. 30, 2011

(65) Prior Publication Data
US 2012/0153575 A1   Jun. 21, 2012

(30) Foreign Application Priority Data
Dec. 16, 2010   (EP) ..................................... 10015718

(51) Int. Cl.
*F16J 15/32*    (2016.01)
*F16J 15/3212*  (2016.01)

(52) U.S. Cl.
CPC ................... *F16J 15/3212* (2013.01)

(58) Field of Classification Search
CPC .... F16J 15/3232; F16J 15/324; F16J 15/3236; F16J 15/3212
USPC .................. 277/560, 549, 553, 559
See application file for complete search history.

(56) References Cited

U.S. PATENT DOCUMENTS

| | | | | |
|---|---|---|---|---|
| 4,522,411 A | * | 6/1985 | Burgan | F16J 15/3244 277/552 |
| 4,964,647 A | * | 10/1990 | Stephan | 277/560 |
| 2002/0074734 A1 | * | 6/2002 | Reinhardt | F16J 15/3208 277/549 |
| 2004/0169339 A1 | * | 9/2004 | Bock | F16J 15/3216 277/549 |
| 2009/0152779 A1 | * | 6/2009 | Imoto et al. | 267/129 |
| 2009/0166982 A1 | * | 7/2009 | Kondo | F02M 59/442 277/549 |
| 2012/0001395 A1 | * | 1/2012 | Kurth | F16J 15/3284 277/412 |

FOREIGN PATENT DOCUMENTS

| | | |
|---|---|---|
| DE | 1007130 B | 4/1957 |
| DE | 2458773 A1 | 10/1975 |
| DE | 4443442 A1 | 6/1996 |
| EP | 0843114 A2 | 5/1998 |
| EP | 1156242 B1 | 11/2005 |
| WO | 2005/116492 A1 | 12/2005 |

\* cited by examiner

*Primary Examiner* — Nathan Cumar
(74) *Attorney, Agent, or Firm* — Harness, Dickey & Pierce, P.L.C.

(57) ABSTRACT

A radial shaft sealing ring for the sealing separation of an internal space (6), from an external space (5), with a sealing lip (2) delimited by a first and a second annular surface (3, 4) of a cone frustum, wherein, the first annular surface (3) is oriented towards the external space (5), and the second annular surface (4) is oriented towards the internal space (6), wherein the annular surfaces (3, 4) are connected to each other via a ring-shaped contact surface (23) of the sealing lip (2), which rests on the shaft (7), wherein the first annular surface (3) forms with the shaft (7) a first angle ($\beta'$) of 23-40° in the installed position, wherein an inner diameter (24) of the ring-shaped contact surface (23) is 1-15 mm in the installed position.

12 Claims, 1 Drawing Sheet

SEALING RING

CROSS-REFERENCE TO RELATED APPLICATIONS

Figure 1:
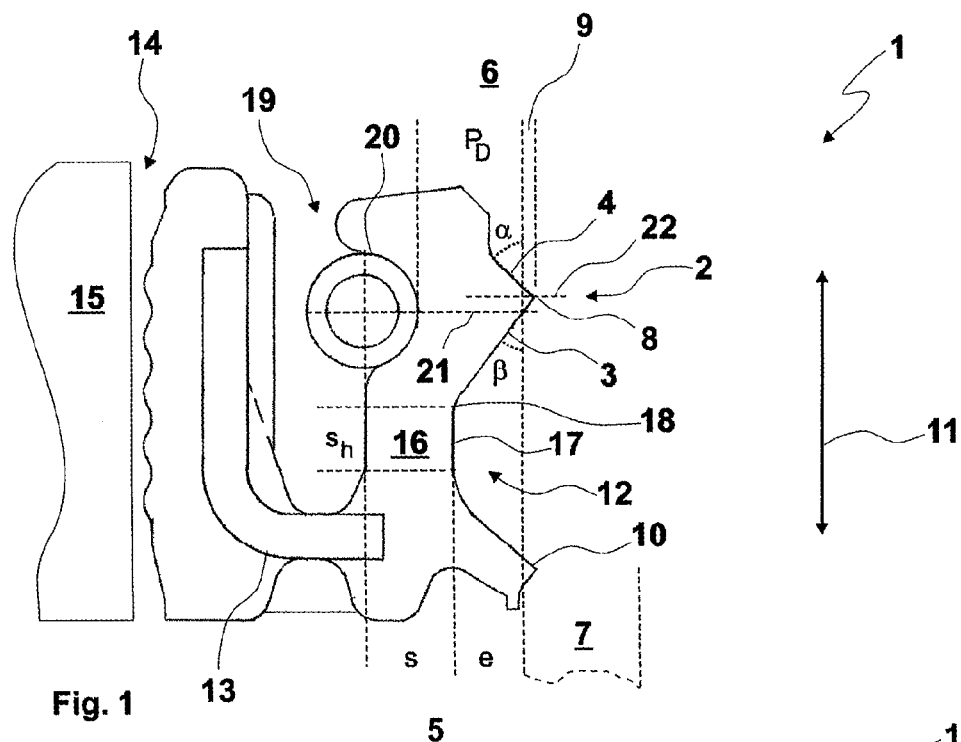

This application claims the benefit and priority of European Patent Application No. EP10015718, filed Dec. 16, 2010. The entire disclosure of the above application is incorporated herein by reference.

FIELD

The present disclosure relates to the sealing of housing openings through which a shaft passes, by means of sealing rings, wherein the sealing rings separate an internal space, which in each case at least partially surrounds the shaft, from an external space. Here, the internal space can be a housing internal space which is separated, optionally in a pressure-tight manner, by a sealing ring with respect to an external space surrounding the housing, so that fluids, gases and/or aerosols cannot exit from the housing internal space, and no introduction of material from the external space into the housing internal space can occur. Accordingly, the disclosure also relates to a housing having such a sealing ring.

BACKGROUND

In EP 1 156 242 B1, a sealing ring is disclosed, which is designed as a radial shaft sealing ring, and which is constructed from a ring-shaped metal supporting body and a sealing lip attached to it. The radial shaft sealing ring, in the installed position, has a shaft passing through it, where the sealing lip separates in a sealing manner a hydraulic side, particularly one that is under pressure, or an internal space or a housing internal space, from an atmospheric side or an external space. Moreover, the sealing lip is pressed by means of an annular helical spring on the shaft, and in addition, an additional sealing lip, oriented towards the atmospheric side, can further reduce the introduction of soiling material in the direction of the hydraulic side, and thus in the direction of the housing internal space. The sealing lip is formed substantially by two cylindrical surfaces of a cone frustum, where the first cylindrical surface of a cone frustum is oriented towards the atmospheric side or towards the external space, and the second cylindrical surface of a cone frustum is oriented towards the hydraulic side or the internal space. The first cylindrical surface of a cone frustum presents a kink, so that, in the uninstalled state of the sealing ring, an angle α of 35-65°, preferably 45-60° can be formed between the axial direction and the first cylindrical surface of a cone frustum, in the area of the contact surface of the sealing lip on the shaft. The angle β of the second cylindrical surface of a cone frustum with respect to the axial direction in the uninstalled state is 15-30°, preferably 17-22°. In the installed position of the sealing ring with the shaft, the angles α and β are approximately of equal size, and then have values between 20 and 50°, preferably 30°. This change of the angles α, β of the uninstalled state compared to the installed position is explained by an overlap, due to which, when the shaft is introduced into the sealing ring, on the one hand, precisely this change in angle occurs, and, on the other hand, the periphery of the sealing lip at the time of the installation of the shaft is elastically broadened.

In DE 24 58 773 A1, a seal is described, particularly for rotary shafts, which consists of a metal ring-shaped supporting body, to which a sealing lip is attached. To prevent buckling due to a pressure load caused by the pressure in the housing internal space, the surface which is oriented towards the external space and forms the sealing lip is designed so it is free of kinks. In addition, any discontinuities of precisely this surface, which delimits the sealing lip, and which is oriented towards the external space, would potentially lead to a folding over or folding down of the sealing lip, in the installation of the shaft. This effect can be decreased or prevented by a design without kink or a design without discontinuity. Here, the angle between this surface delimiting the sealing lip in the area of the contact surface of the sealing lip on the shaft—before the installation of the shaft—is at least 35°. Due to the overlap, this angle may end up being smaller in the installed position of the seal with the shaft. In addition, due to a potential relative excess pressure generated in the housing internal space, the value of this angle can be further decreased.

Sealing rings whose sealing lips are delimited by mutually intersecting tapered surfaces, that is cylindrical surfaces of a cone frustum, are thus usually used as seals in the area of housing openings, in which a shaft passes through the housing. Usually, the lip of the sealing ring, with respect to the surface to be sealed off or with respect to the shaft to be inserted in the sealing ring, presents a radial overlap, so that when the shaft is inserted into the sealing ring, the sealing lip is under radial preliminary tension and broadened. Due to the radial preliminary tension, the sealing lip encloses the surface or shaft to be sealed off in a sealing manner. In the case of large inner diameters >20 mm of the forming ring-shaped contact surface of the sealing lip on the shaft, the preset overlap of the sealing lip towards the shaft surface to be sealed off has nearly no effect on the axial width of the contact surface. This is due to the fact that sealing rings with large diameters and associated large sealing lip peripheral lengths, at the time of their installation on the shaft, can be broadened without problem by the amount of the overlap, without disadvantageous effect on the radial contact pressure of the sealing lip on the surface to be sealed off, and thus on the axial width of the contact surface. However, the smaller the shaft diameter, and thus also the inner diameter of the ring-shaped contact surfaces of the sealing rings, becomes, the smaller the resulting possible expansion of the sealing lip over the periphery is. Accordingly, with decreasing shaft radius or inner diameter of the contact surface of the sealing lip on the shaft, a broadening of precisely this contact surface can occur due to an undesired large deformation and contact pressure of the sealing lip on the surface to be sealed off. However, a broadening of the contact surface causes greater wear of the sealing lip as well as a worsened, undifferentiated sealing behavior. If, in addition, the contact surface is shifted more strongly towards the external space or towards the atmospheric side, particularly during start-stop operation, nicking or notching in the sealing lip occurs increasingly, particularly in the case of insufficient lubrication. As a result, leaks can develop in the area of the sealing lip.

SUMMARY

The present disclosure is based on the problem of providing an improved sealing ring or an improved housing with such a sealing ring, wherein the sealing ring should present good performance characteristics for a long service life, even if it has only a small diameter.

As an aspect of the present disclosure, a sealing ring is proposed, particularly a radial shaft sealing ring for the sealing separation of an internal space, which at least partially surrounds the shaft, from an external space which also surrounds the shaft at least partially. Said sealing ring is provided with a sealing lip delimited by a first and a second annular surface of a cone frustum. Here, the first annular surface of a cone frustum is oriented in the axial direction towards the external space, while the second annular surface of a cone frustum is oriented in the axial direction towards the internal space. Moreover, the annular surfaces of a cone frustum, in the installed position, are attached to each other via a ring-shaped contact surface of the sealing lip, which rests on the shaft. The first annular surface of a cone frustum together with the shaft in the installed position forms a first angle of 23-40°. The inner diameter of the ring-shaped contact surface resting on the shaft here is 1-15 mm, in the installed position, as a function of the diameter of the given shaft to be sealed off.

Advantageously, by means of such a design of the sealing lip, in spite of the overlap of the surface to be sealed off, a small axial width of the contact surface can be formed in the installed position with the shaft.

A shaft can be arranged which passes through a housing or a housing opening in such a manner that the shaft is surrounded both by the housing internal space and also by the external space surrounding the housing. In the housing opening through which the shaft passes, a sealing ring can be inserted for the sealing or separation of the internal space with respect to the external space, in accordance with the intended purpose. The housing internal space here can contain fluids, gases, aerosols or the like, and it can be under increased pressure compared to the external space. Accordingly, the sealing ring prevents the exit of the fluids, gases, aerosols or the like contained in the housing internal space. Moreover, the sealing ring prevents the introduction of material from the external space into the internal space. As a result, soiling of the internal space and the fluids, gases, aerosols or the like contained therein, with soiling material originating from the external space, can be prevented advantageously.

The sealing lip of the sealing ring, which, in the installed position with the shaft, substantially achieves the separation of the external space from the internal space, is delimited by two annular surfaces of a cone frustum. In other words, the sealing lip is delimited by mutually intersecting conical lateral surfaces. In the uninstalled state and possibly without wear traces, the cylindrical surfaces of a cone frustum of the sealing lip can be connected to each other via a circular contact edge. When the shaft is then introduced, the sealing ring is converted into the installed position, and due to an overlap, the sealing lip is pressed on the shaft in such a manner that a ring-shaped contact surface is formed on the sealing lip, by means of which the sealing lip then rests on the shaft. Here, overlap or a radial overlap denotes a difference between the shaft radius and the relatively smaller radius of the sealing lip in the uninstalled state. If the shaft is now introduced into the sealing ring, then the sealing lip is broadened in the peripheral direction precisely due to said overlap, and the ring-shaped contact surface is formed, by means of which the sealing lip rests on the shaft. Here, in the uninstalled state, the sealing lip can also have a round design, between the two annular surfaces of a cone frustum. The axial direction denotes the direction along the shaft in the installed position with the sealing ring.

The inner diameter of the ring-shaped contact surface applied on the shaft, and thus the shaft diameter, can be 3-15 mm in the installed position.

It is precisely with such small inner diameters or shaft diameters that, using the above indicated embodiments of the sealing ring, which are described below, the desired small axial width of the contact surface can be formed. As a result, particularly for said small shaft diameter or inner diameter, a greater robustness of the sealing ring can be ensured. In addition, nicking or cracking in the sealing lip can at least be decreased, particularly in case of insufficient lubrication, especially during start-stop operation. In addition, the sealing ring, particularly with regard to its sealing effect, is less sensitive especially to a possible shaft eccentricity or with regard to pressure.

Such a centralized arrangement of the contact surface, in which the portions of the contact surfaces which face the external space and the internal space are designed in a balanced manner or with nearly identical size, can be achieved by a first angle of 23-40° in the installed position. Moreover, the design of the contact surface can be improved by a first angle of 28-35°.

This design of the contact surface can be supported by a corresponding design of a second angle, which is arranged between the second annular surface of a cone frustum and the shaft in the installed position. This second angle can be 37-57°, preferably 42-52°. Due to such a design of the second angle, the width of the contact surface can also be minimized, and the portions of the contact surface in the external space and internal space can be designed in a balanced manner.

Such advantageous first and second angles in the installed position of the sealing ring with the shaft can be designed in a supporting manner during the installation by the fact that the first and the second angle present a corresponding preset value in the uninstalled state.

Thus, the first angle in the uninstalled state can present a value of 37-50°, preferably 42-45°. The second angle in the uninstalled state can present a value of 30-45°, and preferably 35-40°.

With such preset first and second angles in the uninstalled state of the sealing ring, the advantageous first and second angles in the installed position of the sealing ring with the shaft can be represented, after the installation of the shaft in the sealing ring.

In addition, the sealing ring can present an additional sealing lip arranged in the external space and/or oriented towards the external space. This additional sealing lip can advantageously further decrease or prevent the introduction of material from the external space into the internal space, and thus counteract the soiling of the internal space.

Moreover, an intermediate space can be provided between the sealing lip and the additional sealing lip. Said intermediate space is delimited by the sealing lips, and sealed off by the two sealing lips. In the installed position with the shaft, a lubricant can be introduced, for example, fat, oil, graphite, Teflon or the like, in said intermediate space. In this manner, the intermediate space arranged between the two sealing lips can advantageously serve as a lubricant reservoir.

Moreover, the sealing ring can present a ring-shaped, bearing supporting body. This ring-shaped bearing supporting body can be manufactured from metal or from another heat resistant and deformation resistant material. This ring-shaped, bearing supporting body can be designed advantageously as a sleeve.

By means of this ring-shaped, bearing supporting body, the sealing ring can be stabilized and stiffened overall. As a result, the ease of handling is simplified, particularly at the time of the installation. In addition, due to the ring-shaped, bearing supporting body, the outer shape and dimension of the sealing ring are substantially predetermined. The sealing ring can be installed so it is held permanently in its installation space in a housing.

Moreover, the sealing ring can present a hollow cylindrical section to which the sealing lip is attached in such a manner that an inner lateral surface of the hollow cylindrical section transitions into the first annular surface of a cone frustum.

The first annular surface of a cone frustum, which transitions directly into the inner lateral surface of the hollow cylindrical section, can be designed so it is free of kinks. Due to the absence of discontinuities or kinks in the first annular surface of a cone frustum, a flapping over or buckling over of the sealing lip at the time of the installation of the shaft in the sealing ring can be avoided or prevented.

Moreover, the ring-shaped bearing supporting body can be connected via a hollow cylindrical section to the additional sealing lip. Accordingly, the intermediate space arranged between the two sealing lips can be designed by means of the hollow cylindrical section in such a manner that a corresponding desired volume can be optimized, for example, for a lubricant reservoir.

Moreover, on the radially turned away side of the sealing lip, a ring-shaped clamping element can be arranged, by means of which the sealing lip can be pressed on the shaft in the installed position.

Such a clamping element can be designed as an annular helical spring. The clamping element presents a radial force action. The clamping element can be designed as a separate component made of metal, for example, or it can be molded integrally with the sealing lip from an elastic material. In this manner, it is also conceivable that the clamping element is formed from the same or from a similar material as the sealing lip, integrally with the latter.

Advantageously, an additional contact pressure can be generated by the clamping element, by means of which the contact surface can be shaped, in addition to the other possible forces. Thus, for example, by changing the working plane of the radial force action of the clamping element, a change in the position as well as the shape of the contact surface is possible.

Here, the working plane of the radial force action of the clamping element can be shifted with respect to a contact plane of the sealing lip axially in the direction of the external space. This can be the case in the installed position and/or in the uninstalled state of the sealing ring. By means of such a positioning of the clamping element, a greater robustness, particularly with respect to the eccentricity of the shaft and a corresponding pressure application from the internal space, can be achieved. The angles of the annular surfaces of a cone frustum relative to the surface to be sealed off are as a result equally stable throughout the entire service life of the sealing ring.

The sealing lip as well as the additional sealing lip and also the hollow cylindrical section can be made of the same material or of different materials. All the above-indicated components can be formed from a material having the same or a different elasticity. The above-mentioned components can be formed in any combination from the same material or a different material as well as from a material having the same elasticity or a different elasticity. The above-mentioned components can be designed in a different combination with respect to each other integrally or in multiple parts. Thus, they can be attached by molding to each other using different or identical materials, or they can present an additional supporting body for stabilization, to which an elastic material is applied by molding. The hollow cylindrical section can be attached by molding to the ring-shaped, bearing supporting body, or connected by another means to the same.

In an additional aspect of the invention, a housing with a sealing ring as described above is proposed. Such a housing presents a more robust and less sensitive sealing with less wear during operation, even if the sealing ring which is used, during its use for its intended purpose, in adaptation to the shaft diameter to be sealed off, presents an inner diameter of only 3-15 mm.

DRAWINGS

Figure 2:
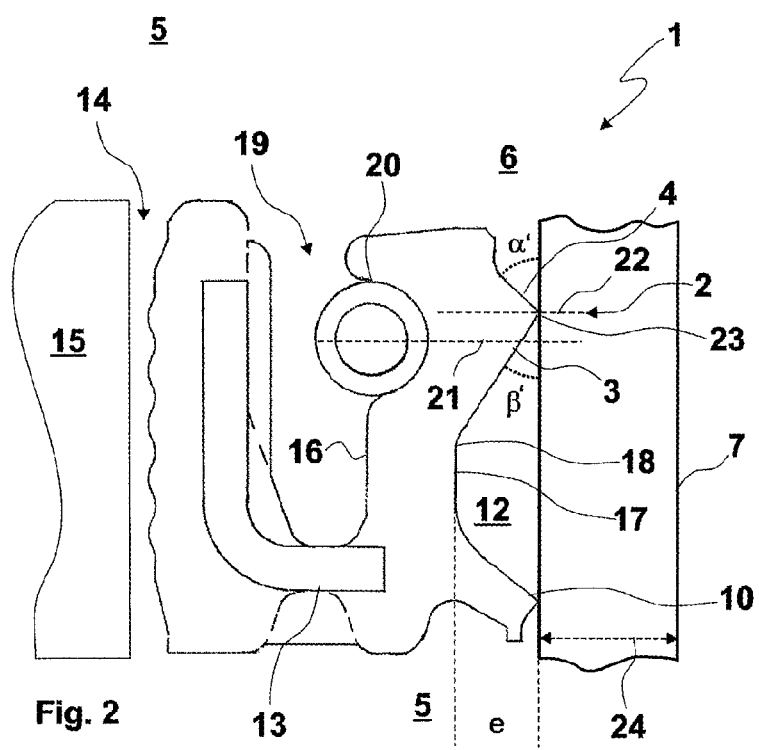

The figures each show diagrammatically:
FIG. 1 is a sealing ring in the uninstalled state, and
FIG. 2 is the sealing ring in the installed position with a shaft.

DETAILED DESCRIPTION

FIG. 1 represents a sealing ring 1 in the uninstalled state. Said sealing ring 1 is provided with a sealing lip 2 which is delimited by a first annular surface 3 of a cone frustum and a second annular surface 4 of a cone frustum. The first annular surface 3 of a cone frustum is oriented towards an external space 5, and the second annular surface 4 of a cone frustum is oriented towards an internal space 6. Because such a sealing ring 1 can be used to seal off, for example, a shaft 7 which passes through a housing opening, the internal space 6 can represent a housing internal space, while the external space 5 surrounds the housing.

In the represented uninstalled state, the shaft 7 to be introduced later is also represented, to illustrate an overlap 9 of the sealing lip 2. Between the first annular surface 3 of a cone frustum and the shaft 7 to be introduced subsequently, a first angle $\beta$ is arranged, and a second angle $\alpha$ is arranged between the second annular surface 4 of a cone frustum and the shaft 7 to be introduced subsequently.

Moreover, the sealing ring 1 is provided with an additional sealing lip 10 which is oriented in the axial direction 11 towards the external space 5. Between the two sealing lips 2, 10, an intermediate space 12 is arranged. By means of the two sealing lips 2, 10, the intermediate space 12 is closed off in a sealing manner with respect to the external space 5 and/or with respect to the internal space 6.

The sealing ring 1 is also provided with a ring-shaped, bearing supporting body 13 which serves to stabilize, stiffen, and form the outer shape of the sealing ring 1. Due to the complementary formation of the outer shape of the sealing ring 1, it becomes possible to introduce the sealing ring 1 in a simple manner into the housing opening 14 of the housing 15. Moreover, the sealing ring 1 presents a hollow cylindrical section 16, to which the sealing lip 2 is connected in such a manner that an inner lateral surface 17 of the hollow cylindrical section 16 transitions without abrupt changes in direction into the first annular surface 3 of a cone frustum. The first annular surface 3 of a cone frustum, which extends from the attachment place 18 of the inner lateral surface 17 to the first annular surface 3 of a cone frustum up to the contact edge 8, is designed without kinks.

The hollow cylindrical section 16 is attached to the ring-shaped, bearing supporting body 13, and connected to the additional sealing lip 10 as well as the sealing lip 2. In addition, the sealing ring 1 presents, on the side turned radially away from the sealing lip 2, a ring-shaped clamping element 20, by means of which the sealing lip 2 is pressed on the shaft 7 in the installed position. Here, a working plane 21 of a radial force action of the clamping element 20 is moved with respect to a contact plane 22 spanned by the circular contact edge 8, in the axial direction 11 towards the external space 5.

In FIG. 1, the additional parameters $P_D$, s, $s_h$, e of the sealing lip 1 in the uninstalled state are also indicated; they are further specified in the following embodiment example.

Embodiment Example

Variation of the measurements of a possible embodiment as shown in FIG. 1

| Parameter | Advantageous measurement ranges | Preferred measurement ranges |
|---|---|---|
| $P_D$ | 0.8-1.6 mm | 1.1-1.3 mm |
| s | 0.6-1.2 mm | 0.8-1.0 mm |
| $s_h$ | 0.4-1.1 mm | 0.6-0.9 mm |
| e | 0.4-1.0 mm | 0.6-0.8 mm |
| α | 30-45° | 35-40° |
| β | 37-50° | 42-45° |

In the embodiment shown in FIG. 1, all the combinations of the above-indicated values for the parameters are admissible and usable.

FIG. 2 represents the sealing ring 1 of FIG. 1 in the installed position with the shaft 7. Here, in the installed position, the first angle β' and the second angle α' is another angle than the first angle β and the second angle α in the uninstalled state. In addition, a contact surface 23 forms at the time of the installation of the shaft 7.

In the installed position, the inner diameter 24 of the contact surface 23 corresponds to the diameter to be sealed off of the shaft 7. Similarly, the working plane 21, in the installed position, assumes another position with respect to the contact plane 22 than in the uninstalled state.

What is claimed is:

1. A sealing ring, particularly radial shaft sealing ring, for the sealing separation of an internal space (6), which in each case at least partially surrounds a shaft (7), from an external space (5), comprising:

a sealing lip (2) delimited by a first and a second annular surface (3, 4) of a cone frustum, wherein, in an axial direction (11), the first annular surface (3) of a cone frustum is oriented towards the external space (5), and the second annular surface (4) of a cone frustum is oriented towards the internal space (6), wherein the annular surfaces (3, 4) of a cone frustum, in the installed position, are connected to each other via a ring-shaped contact surface (23) of the sealing lip (2), which rests on the shaft (7), wherein the first annular surface (3) of a cone frustum forms with the shaft (7) a first angle (β') of 23-40° in the installed position, wherein an inner diameter (24) of the ring-shaped contact surface (23), which rests on the shaft (7), is 1-15 mm in the installed position, as a function of the diameter of the given shaft (7) to be sealed off, wherein the second annular surface (4) of a cone frustum forms with a center axis of the sealing ring a second angle (α) of greater than 30° in the uninstalled state.

2. The sealing ring according to claim 1, wherein the first angle (β') is 28-35° in the installed position.

3. The sealing ring according to claim 1, wherein the second annular surface (4) of a cone frustum forms with the shaft (7) a second angle (α') of 37-57° in the installed position.

4. The sealing ring according to claim 1, wherein the first angle (β) is 37-50° in the uninstalled state.

5. The sealing ring according to claim 1, wherein the sealing ring (2) presents an additional sealing lip (10) arranged in the external space (5).

6. The sealing ring according to claim 5, wherein an intermediate space (12) is arranged between the sealing lip (2) and the additional sealing lip (10).

7. The sealing ring according to claim 1, wherein the sealing ring (1) presents a ring-shaped, bearing supporting body (13).

8. The sealing ring according to claim 1, wherein the sealing ring (1) includes a hollow cylindrical section (16), to which the sealing lip (2) is attached in such a manner that an inner lateral surface (17) of the hollow cylindrical section (16) transitions into the first cylindrical surface (3) of a cone frustum.

9. The sealing ring according to claim 1, wherein the first cylindrical surface (3) of a cone frustum is designed without kinks.

10. The sealing ring according to claim 8, wherein the ring-shaped, bearing supporting body (13) is connected via a hollow cylindrical section (16) to the additional sealing lip (10).

11. The sealing ring according to claim 1, wherein on the side of the sealing lip (2), which is radially turned away, a ring-shaped clamping element (20) is arranged, by means of which the sealing lip (2) can be pressed on the shaft (7) in the installed position.

12. The sealing ring according to claim 11, wherein a working plane (21) of a radial force action of the clamping element (20) is moved with respect to a contact plane (22) of the sealing lip (2) axially in the direction of the external space (5).

* * * * *